United States Patent [19]

Hayes

[11] Patent Number: 4,687,563

[45] Date of Patent: Aug. 18, 1987

[54] ELECTROCHEMICAL MACHINE APPARATUS WITH DRILL-DEPTH AND RATE MONITOR

[75] Inventor: David V. Hayes, Painted Post, N.Y.

[73] Assignee: Corning Glass Works, Corning, N.Y.

[21] Appl. No.: 718,528

[22] Filed: Apr. 1, 1985

[51] Int. Cl.$^4$ .......................... B23H 9/14; B23H 7/32; B23B 39/04; B23B 39/06

[52] U.S. Cl. ............................... 204/224 M; 204/225; 219/69 G; 408/12; 408/13

[58] Field of Search ........... 204/129.2, 129.55, 224 M, 204/225; 219/69 R, 69 G; 408/8–13

[56] References Cited

U.S. PATENT DOCUMENTS

| | | | |
|---|---|---|---|
| 3,287,245 | 11/1966 | Williams | 204/224 M |
| 3,302,492 | 2/1967 | Weidig | 408/10 X |
| 3,475,997 | 11/1969 | Wohlfeil | 408/8 |
| 3,475,998 | 11/1969 | Steiner et al. | 408/8 |
| 3,595,132 | 7/1971 | Thacker | 408/11 X |
| 3,723,016 | 3/1973 | Lehmkuhl | 408/11 X |
| 3,793,169 | 2/1974 | Joslin | 204/129.55 |
| 4,174,268 | 11/1979 | Andrews | 204/224 M X |
| 4,345,131 | 8/1982 | Semon et al. | 219/69 G |
| 4,387,009 | 6/1983 | Gardner et al. | 204/129.55 X |
| 4,415,791 | 11/1983 | Yamada et al. | 219/69 G |
| 4,441,059 | 4/1984 | Watanabe | 408/11 |
| 4,495,394 | 1/1985 | McGregor et al. | 219/69 G X |
| 4,510,365 | 4/1985 | MacGregor et al. | 219/69 G |
| 4,510,367 | 4/1985 | Obara | 219/69 |
| 4,532,599 | 7/1985 | Smith | 408/11 X |

Primary Examiner—Donald R. Valentine
Attorney, Agent, or Firm—R. N. Wardell; D. M. Heist

[57] ABSTRACT

A drilling rate and depth monitor is provided for determining the rate in which apertures are formed in a workpiece using an electro-chemical machining process. The drilling rate and depth monitor is particularly useful where the rate of aperture formation is extremely slow, i.e., less than one-thousandths of an inch per second. The drilling rate includes a position sensor coupled between a workholder and a movable member supporting a plurality of cathodic drilling tubes which yields a depth signal proportional to the distance between the drilling tubes and the surface of the workpiece. Differentiation means are responsive to the depth signal for producing a drilling rate signal and display means are provided for both the drilling rate and drilling depth.

13 Claims, 3 Drawing Figures

… … …

ELECTROCHEMICAL MACHINE APPARATUS WITH DRILL-DEPTH AND RATE MONITOR

BACKGROUND OF THE INVENTION

The present invention relates in general to electrochemical milling machines, and in particular, relates to an improved drilling depth and drilling rate monitor for use in electro-chemical machining processes.

In recent years, extruded ceramic materials have been increasingly used as substrates for automotive catalytic converter products. During the course of their manufacture, these extruded ceramic substrates are forced through highly precise extrusion dies which are formed of ultra-hard materials.

The manufacture of extrusion dies from these ultrahard materials is an extremely tedious process. The extrusion dies are formed with multiple apertures through which the extrudate is forced under high pressures. In one method of forming the extrusion die, mechanical drills are used to form the extrusion apertures. If the extrusion dies are formed of ultra-hard materials such as, for example, 17-4PH stainless steel or inconel 718, the drilling rate used for aperture formation is very slow and a great deal of time and effort is expended in extrusion die formation. If softer die materials are used the drilling rate is increased, but the lifespan of the resulting extrusion die is correspondingly shorter.

Because of these difficulties, extrusion dies are now provided with extrusion apertures which are formed by electro-chemical machining techniques rather than mechanical drilling. With an electro-chemical machining process for the manufacture of an extrusion die, the workpiece from which the die is to be formed is situated in a fixed position relative to a movable manifold. The manifold supports a plurality of cathode drilling tubes, each of which are utilized to form an aperture in the workpiece. The drilling tubes operate as cathodes in the electro-chemical machining process, whereas the workpiece comprises the anode in that process. The workpiece is then flooded with an acid electrolyte which is supplied via the manifold and material is selectively depleted from the workpiece in the vicinity of the drilling tubes to form the requisite aperture pattern.

In the manufacture of extrusion dies using an electrochemical milling process, the rate of movement of the drilling tubes with respect to the workpiece must be precisely controlled. If the drilling rate varies the diameter of the apertures increases as the drilling rate slows. The aperture diameter decreases as the drilling rate increases. Since it is important that the aperture diameter be precisely controlled in ceramic extrusion dies, it is paramount that drilling rate be precisely controlled.

The precise control of the drilling rate in an electrochemical machining process is not a simple problem. For example, the drilling rate which is achieved in the formation of extrusion dies is less than one-thousandth (0.001) of an inch per second.

Such extremely slow rates makes the design of circuitry for a drill rate monitor difficult. In the manufacture of some precision components such as extrusion dies for ceramic materials, it is also important, not only that the very slow rate of drilling be precisely controlled but also that the depth of the aperture formed in an electro-chemical machining process also be precisely controlled.

These and other objects are achieved by the drilling depth and drilling rate monitor of the present invention.

SUMMARY OF THE INVENTION

The drilling depth and rate monitor of the present invention includes a workholder for supporting the workpiece in which apertures are to be formed into an extrusion die, a means movable with respect to the workholder for supporting a drilling means and a position sensor coupled between the workholder and the movable means for generating a depth signal proportional to the distance between the drilling means and the surface of the workpiece. A drilling rate signal is provided by a differentiation means responsive to that depth signal. In accordance with an important aspect of the present invention, that differentiation means includes a field effect input operational amplifier which produces a stable output with very low current inputs. Means are responsive to that operational amplifier for displaying the desired drilling rate. In accordance with still another important aspect of the present invention, the position sensor further includes a linear variable differential transformer including a coil mounted to the movable means and a core fixed with respect to the workholder, the depth signal being a function of the relative position of the core with respect to the coil.

In addition, the present invention provides an electrochemical machining apparatus which forms apertures in the workpiece which includes a workholder for supporting the workpiece and a manifold movable with respect to the workholder at extraordinarily low rates of less tham 0.001 inches per second. The manifold supports a plurality of cathodic drilling tubes for distributing liquid electrolyte to the workpiece. The position sensor is coupled between the workholder and the manifold and generates a depth signal proportional to the distance between the drilling tubes and the surface of the workpiece. A drilling rate monitor is coupled to the position sensor and is responsive to it. The drilling rate monitor includes a field effect input, operational amplifier type differentiation means which produces a precise drilling rate signal. The signal is not only displayed, but in one embodiment, is utilized to control the drive means for the manifold such that the drilling rate employed may be accurately and precisely controlled.

BRIEF DESCRIPTION OF THE DRAWINGS

The improved monitor of the present invention will be more fully understood by reference to the accompanying drawings, in which.

DETAILED DESCRIPTION OF THE PREFERRED EMBODIMENT

Figure 1:
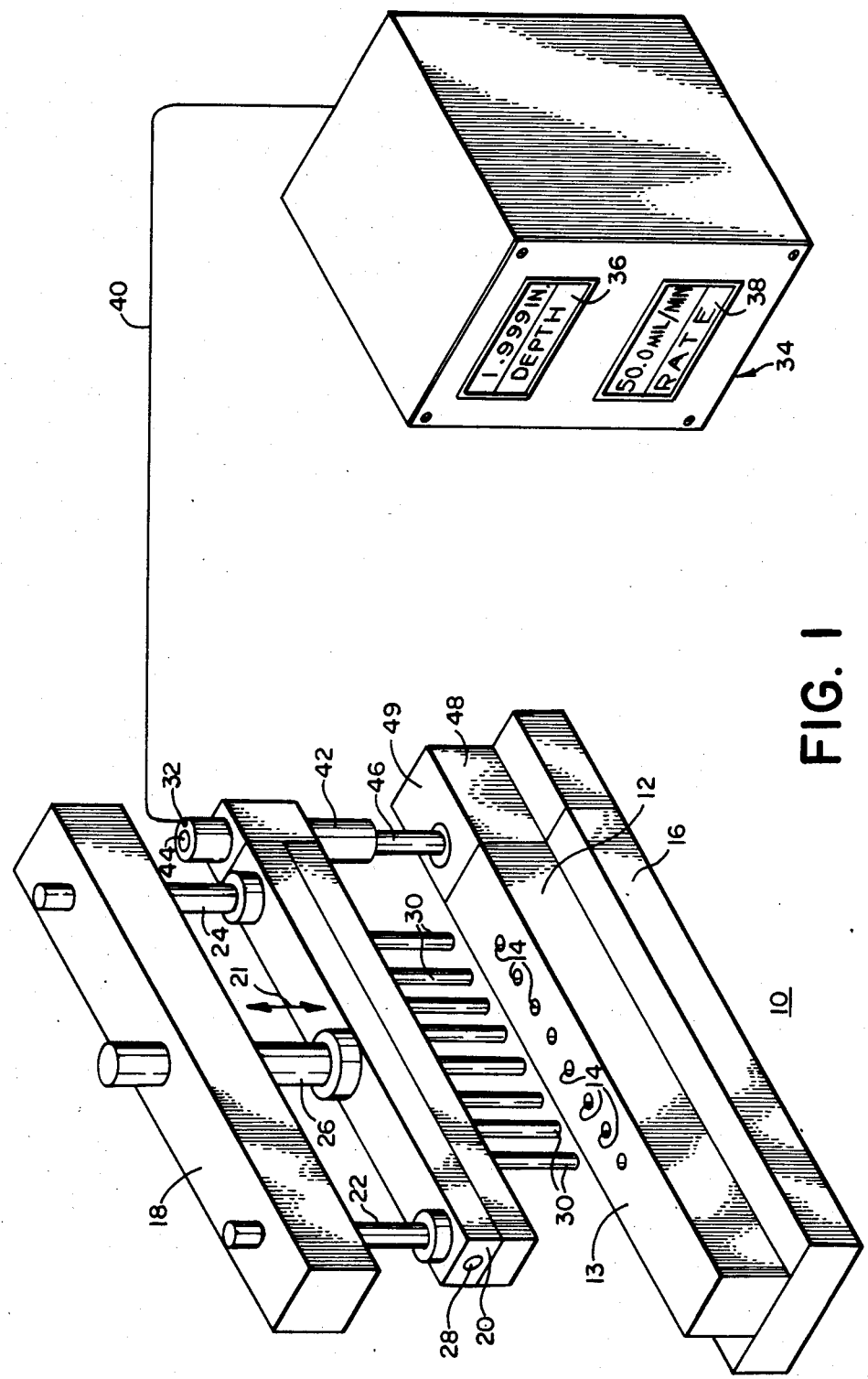
FIG. 1 is a perspective view of an electro-chemical milling machine coupled to the drill rate and depth monitor of the present invention.

Referring now to FIG. 1, the drill rate monitor of the present invention will be described in detail. As shown in FIG. 1, an electro-chemical milling machine 10 is provided. The electro-chemical milling machine 10 operates on a workpiece 12 in which apertures such as 14 are to be formed on an upper surface thereof. Although the present invention is not so limited, the invention finds particular utility in the formation of extrusion dies for the extrusion of ceramic substrates utilized in automotive catalytic converter applications. In such applications, the workpiece 12 to be formed into an extrusion die is comprised of ultra-hard materials such as, for example, stainless steel or Inconel.

The workpiece 12 as shown in FIG. 1 has an upper surface 13 and a lower surface which is coupled to a base member or workholder 16. The base member 16 which is fixed relative to movable portions of the milling machine 10 which will be described below.

Also fixed with respect to the base member or workholder 16, is a cross-head 18. The cross-head 18 supports a manifold 20 which is movable with respect to it. The manifold 20 is thus movable not only with respect to the crosshead, but also with respect to the workpiece 12 and the base 16. The manifold 20 moves in a vertical direction with respect to the workpiece 12 as shown by arrows 21. The manifold 20 slides along guide rods 22 and 24 which are fixedly mounted with respect to the cross-head 18 and slidably mounted with respect to the manifold 20. Movement of the manifold 20 with respect to the cross-head 18 is controlled by a feed rod 26 comprising a drive means such as a lead screw. Rotation of the lead screw with respect to the cross-head 18 causes the feed rod 26 to move in the direction of arrow 21 toward or away from the workpiece 12 as desired. The manifold 20 includes at one extreme thereof a liquid electrolyte port 28 to which liquid electrolyte is supplied. A lower surface of the manifold 20 supports a plurality of drilling tubes 30 to which the liquid electrolyte from the liquid electrolyte port 28 is distributed. The drilling tubes 30 operate as cathodes in the electrochemical machining process, whereas the workpiece 12 operates as the anode in that process.

In accordance with the present invention, the electrochemical milling machine 10 further includes a position sensor shown generally at 32 which senses the relative position of the manifold 20 with respect to the workpiece 12. The position sensor 32 thus detects the position of the drilling tubes 30 supported by manifold 20 with respect to the upper surface 13 of the workpiece 12. The position sensor 32 is coupled to a combined power supply and read-out unit 34. Because of the harsh environment caused by the acidic electrolyte in the vicinity of the workpiece 12, it is desirable to remotely situate the combined power supply/read-out unit 34. The power supply/read-out unit 34 includes a depth read-out 36 which indicates the depth of the apertures 14 with respect to the upper surface 13 of the workpiece 12. The power supply/read-out unit 34 further comprises a drilling rate read-out 38 which indicates the rate at which such apertures are formed in units such as, for example, mils per minute or inches per second.

The power supply/read-out unit 34 is coupled to the position sensor 32 by means of a signal cable 40. In accordance with an important aspect of the present invention, the position sensor 32 preferably comprises a linear variable differential transformer (LVDT). It has been found that a linear differential transformer made by Schaevitz Model No. 1000 DC-D is particularly useful in the present application.

The linear variable differential transformer used for the position sensor 32 preferably includes a coil 42 to which the signal cable 40 is directed. The coil 42 includes a central aperture 44 in which a linearly movable core 46 is situated. As shown, the core 46 is fixedly mounted with respect to a core mounting block 48 having an upper surface 49 thereof which is parallel to the upper surface 13 of the workpiece 12. Also as shown, the coil 42 of the position sensor 32 is fixedly mounted with respect to the manifold 20 such that movement of the manifold 20 with respect to the workpiece 12 varies the inductance in the coil dependent upon the position of core 46 in the bore 44 of the coil 42. It should be recognized that the relative position of the core 46 and the coil 42 as shown in FIG. 1 could be reversed with the coil 42 being fixed to the mounting block 48 and the core 46 fixed to the manifold 20. With either arrangement, an output signal is induced on signal cable 40 which is a function of the position of the core 46 with respect to the magnitude of the coil 42.

The linear variable differential transformer used as the position sensor in the present invention generates a ±10 volt DC full scale output as the core 46 moves ±1 inch from the center-null position at which the core 46 is fully encased within the bore 44 of the coil 42. Therefore, the linear voltage differential transformer has the capability of measuring movements of the manifold ranging from 0 to 2 inches in absolute value.

Figure 2:
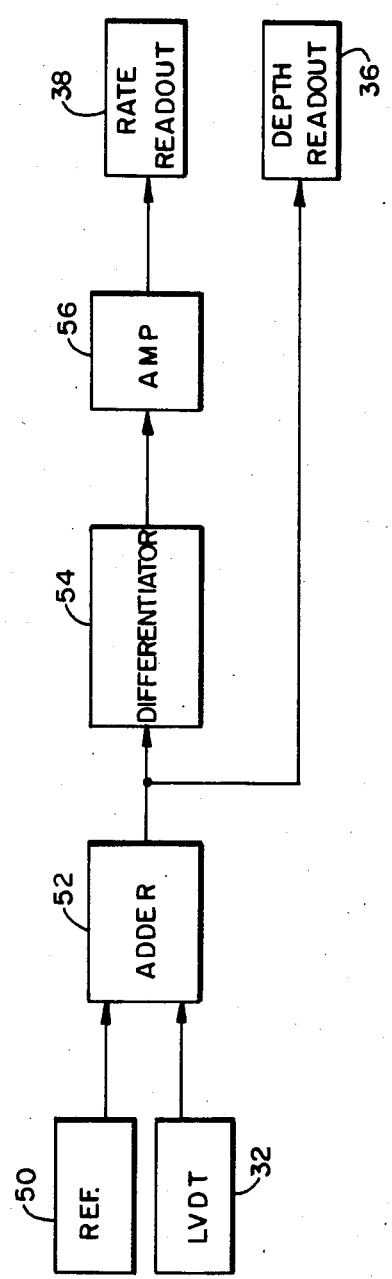
FIG. 2 is a block diagram of the drill rate monitor of the present invention.

Referring now to FIG. 2, a schematic diagram of the drill rate monitor of the present invention will be described. As shown in FIG. 2, the input to the drill rate monitor of the present invention is a signal from the linear variable differential transformer 32. As mentioned above, the output of the linear variable differential transformer 32 is a signal ranging between ±10 volts DC. Because the output of the linear variable differential transformer is a bi-polar signal over its operating range, it is necessary to convert that signal to a uni-polar signal. This is accomplished by adding the output from the linear variable differential transformer 32 to a 10 volt reference signal from a voltage reference circuit 50 at the adder 52. The output of the adder 52 is a depth signal which is a uni-polar voltage signal ranging between 0 and +10 volts. This depth signal is directly proportional to the current depth of each aperture 14 formed in the workpiece 12. This depth signal from the adder 52 is directed to the depth read-out 36. Additionally, the output from adder 52 is directed to a linear differentiator 54 which differentiates the depth signal to yield a drilling rate signal corresponding to the drilling rate used in the formation of each of the apertures 14 of the workpiece 12. The drilling rate signal is a low amplitude DC voltage level which is directed to an amplifier 56 to range and calibrate the drilling rate signal. The amplified drilling rate signal from the amplifier 56 is directed to the rate read-out 38 where it is displayed.

Figure 3:
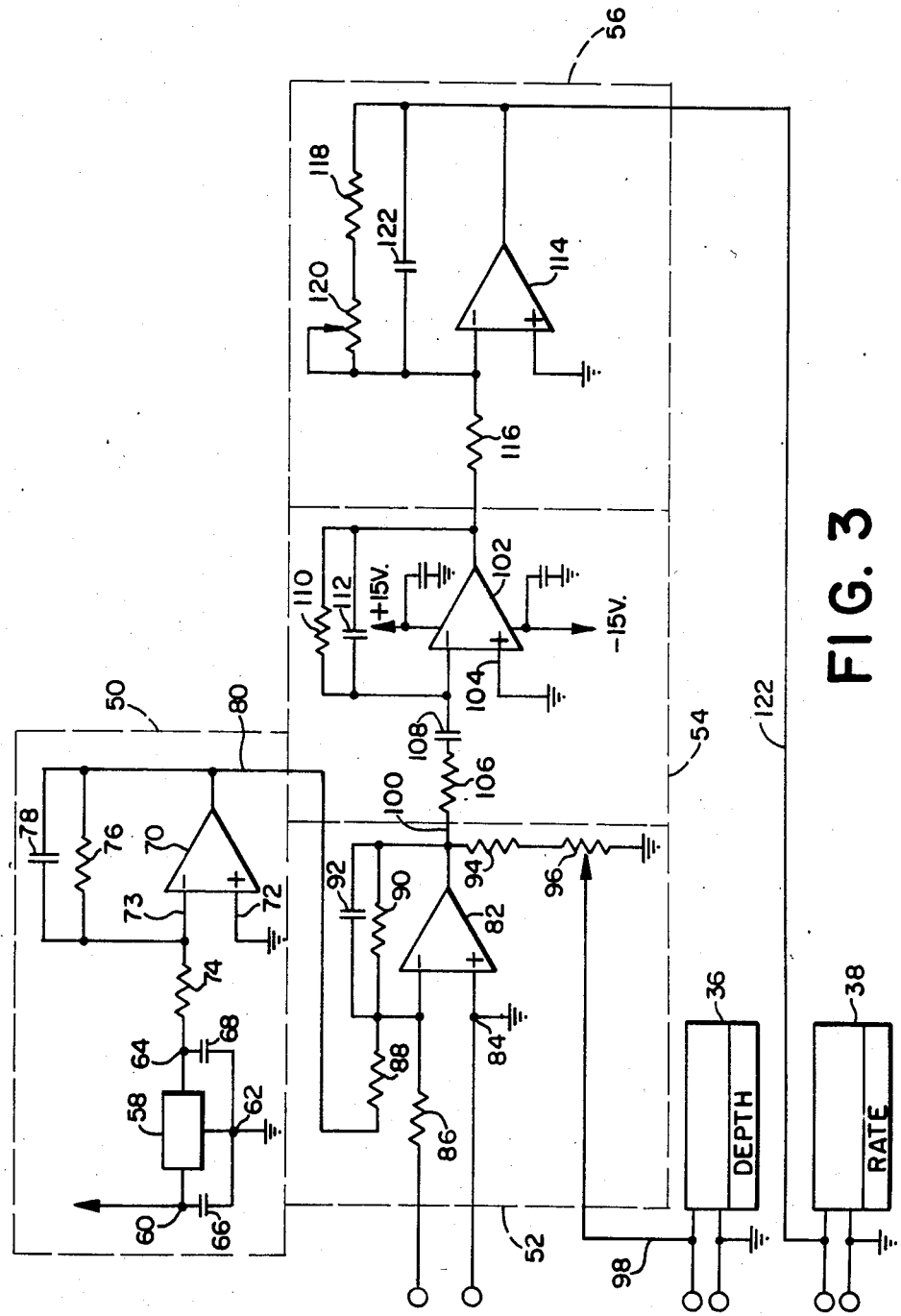
FIG. 3 is a schematic circuit diagram further illustrating the various circuit components illustrated in the block diagram of FIG. 2.

Referring now to FIG. 3, each of the various elements of the block diagram of FIG. 2 will be described in further detail. As shown in FIG. 3, the voltage reference circuit 50 comprises a precision reference integrated circuit 58 which, for example, may be a model REF01DP made by Precision Monolithics, Inc. A 15 volt input signal is provided across terminals 60 and 62 of the precision reference circuit 58 and a +10 volt output signal is produced across terminals 64 and 62. Terminal 62 is coupled to ground. Capacitors 66 and 68 are positioned between input terminals 60–62 and output terminals 64–62, respectively. The output from the precision reference circuit 58 is directed to an inverting DC amplifier 70 having its non-inverting input 72 coupled to ground and its inverting input 73 coupled to the output of the precision reference circuit 58 through a resistor 74. The feedback loop of the inverting DC amplifier 70 includes a resistor 76 in parallel with a capacitor 78. The output of the voltage reference circuit 50 is a −10 volt reference signal which is directed via line 80 to the adder 52.

The adder 52 includes a summer amplifier 82, the non-inverting input 84 of which is connected to ground. The inverting input of summer amplifier 82 is coupled to the linear variable differential transformer 32 through a resistor 86 and to the output of the voltage reference circuit 50 via resistor 88. The feedback loop of the summer amplifier 82 includes the parallel combination of resistor 90 and capacitor 92. The output of the summer amplifier 82 is a uni-polar output signal or depth signal, reflecting the current depth of each of the apertures 14 formed in the workpiece 12.

A simple voltage divider circuit including a first fixed resistor 94 and a second variable resistor 96 couples the output of adder 52 to ground. The voltage divider provides ranging and calibration of the uni-polar depth signal for display at the depth read-out 36, the variable resistor 96 being coupled to the depth read-out 36 via line 98. The variable resistor 96 is adjustable such that the depth read-out 36 will provide for full-scale deflection. The adder 52 is not only coupled to the depth read-out 36, but the uni-polar depth signal is further coupled to the differentiator 54 via line 100. The differentiator circuit 54 is a critical part of the read-out electronics because the rate of change of the depth signal, i.e., the drilling rate, is very small. Accordingly, the differentiator circuit 54 must be particularly sensitive and very precise. To accomplish this result, the differentiator 54 comprises a field effect operational amplifier 102 which, for example, may be a BIFET operational amplifier manufactured by National Semiconductor Corporation, Model No. LF147D. The non-inverting input 104 to the amplifier 102 is coupled to ground whereas the inverting input is coupled to the output of adder 52 on line 100 by a 1K ohm resistor 106 and a 10 microfarad capacitor 108. The feedback loop of the amplifier 102 includes the parallel combination of resistor 110 and a microfarad capacitor 112. The input resistor 106 and the feedback capacitor 112 are provided to minimize the effect of noise.

The output of the differentiator 54 is a low amplitude DC voltage level reflecting the drilling rate. This low voltage drilling rate signal is coupled to the amplifier circuit 56 which ranges and calibrates the signal for display by the drilling rate readout 38. The amplifier circuit 56 includes operational amplifier 114, having an input resistor 116. The feedback loop of the amplifier 114 includes a fixed resistor 118 and a variable resistor 120 which together are in parallel with capacitor 122 to form that feedback loop. The variable resistor 120 may be adjusted to provide full-scale deflection of the drilling rate read-out 38. The output of the amplifier 56 is coupled via line 122 directly to the drilling rate read-out 38 as shown.

The design of the drilling depth rate and monitor of the present invention is particularly suitable for the purposes described because the position sensor comprised of the linear variable differential transformer 32 is unaffected by the acidic electrolyte which bathes the workpiece 12. In addition, the electronic components situated in the power supply/read-out unit 34 are remote from the harsh environment of that electrolyte. The particular differentiator circuit 54 which is employed provides a highly stable drilling rate output despite the extraordinarily low drilling rates utilized in the formation of the extrusion dies in accordance with the present invention.

While a particular embodiment of the present invention has been shown and described, various possible embodiments and changes may be made thereto. Thus it will be understood by those skilled in the art that although preferred and alternative embodiments have been shown and described, the invention is not so limited, and all such variations are included within the spirit and scope of the appended claims.

What is claimed is:

1. A drilling depth and rate monitor for determining the depth of an aperture and the rate of aperture formation in a workpiece comprising:
   a workholder for supporting the workpiece in which apertures are to be formed;
   a means, movable with respect to said workholder, for supporting at least one drilling means;
   a linear variable differential transformer coupled between said workholder and said movable means for generating a depth signal proportional to the distance between said drilling means and a surface of said workpiece, said linear variable differential transformer including a coil mounted to said movable means, and a core in operative engagement with said coil, said core being fixed with respect to said workholder but movable with respect to said coil, said depth signal being a function of the relative position of said core with respect to said coil;
   a differential means responsive to said depth signal for producing a drilling rate signal, said differentiation means including a field effect input operational amplifier; and
   means responsive to said differentiation means for displaying said drilling rate.

2. The drilling depth and rate monitor of claim 1 wherein a bi-polar signal is induced in said coil depending upon the relative position of said core with respect to said coil and wherein said monitor further comprises:
   a means for storing a reference signal; and
   summing means responsive to said reference signal and to said bi-polar signal for producing said depth signal, said depth signal being uni-polar.

3. An electro-chemical machining apparatus for forming apertures in a workpiece comprising:
   a workholder for supporting the workpiece in which said apertures are to be formed;
   a manifold, movable with respect to said workholder, at a rate less than 0.001 inches per second, for supporting a plurality of cathodic drilling tubes and for distributing liquid electrolyte to each of such tubes;
   a position sensor coupled between said workholder and said manifold for generating a depth signal proportional to the distance between said drilling tubes and a surface of said workpiece;
   a drill rate monitor coupled to said position sensor and responsive thereto, said drilling rate monitor including
   differentiation means responsive to said depth signal for producing a drilling rate signal, said differentiation means including a field effect input operational amplifier; and
   means, responsive to said differentiation means for displaying said drilling rate.

4. The electro-chemical machining apparatus of claim 3 wherein said drilling rate monitor further comprises:

means, responsive to said position sensor, for displaying a drilling depth.

5. The electro-chemical machining apparatus of claim 3 wherein said position sensor comprises:
a linear variable differential transformer.

6. The electro-chemical machining apparatus of claim 5 wherein said linear variable differential transformer further comprises:
a coil mounted to said manifold; and
a core, fixed to said workholder but movable with respect to said coil, said depth signal being a function of the relative position of said core with respect to said coil.

7. The electro-chemical machining apparatus of claim 6 wherein a bipolar signal is induced in said coil depending upon the relative position of said core with respect to said coil and wherein said drilling rate monitor further comprises:
a means for storing a reference signal; and
a summing means responsive to said reference signal and to said bi-polar signal for producing said depth signal, said depth signal being uni-polar.

8. The electro-chemical machining apparatus of claim 6 wherein said linear variable differential transformer further comprises:
a core mounted to said manifold; and
a coil, fixed to said workholder but movable with respect to said core, said depth signal being a function of the relative position of said core with respect to said coil.

9. The electro-chemical machining apparatus of claim 8 wherein a bipolar signal is induced in said coil depending upon the relative position of said core with respect to said coil and wherein said drilling rate monitor further comprises:
a means for storing a reference signal; and
a summing means responsive to said reference signal and to said bi-polar signal for producing said depth signal, said depth signal being uni-polar.

10. The electro-chemical machining apparatus of claim 6 further comprising:
drive means for moving said manifold with respect to said workpiece, said drive means being responsive to said drilling rate signal.

11. The electro-chemical machining apparatus of claim 3 wherein said drilling rate monitor is coupled to said position sensor by a signal cable whereby the drilling rate monitor is remote from said workpiece.

12. A drilling depth and rate monitor for determining the depth of an aperture and the rate of aperture in a workpiece comprising:
a workholder for supporting the workpiece in which apertures are to be formed;
a means, movable with respect to said workholder, for supporting at least one drilling means;
a linear variable differential transformer coupled between said workholder and said movable means for generating a depth signal proportional to the distance between said drilling means and a surface of said workpiece, said linear variable differential transformer including a coil fixed with respect to said workholder, and a core in operative engagement with said coil, said core being fixed with respect to said movable means, but movable with respect to said coil, said depth signal being a function of the relative position of said core with respect to said coil; and
a differential means responsive to said depth signal for producing a drilling rate signal, said differential means including a field effect input operational amplifier; and
means responsive to said differentiation means for displaying said drilling rate.

13. The drilling depth and rate monitor of claim 12, wherein a bi-polar signal is induced in said coil depending upon the relative position of said core with respect to said coil and wherein said monitor further comprises:
a means for storing a reference signal; and
summing means responsive to said reference signal and to said bi-polar signal for producing said depth signal, said depth signal being uni-polar.

* * * * *